United States Patent [19]
Cornelius et al.

[11] Patent Number: 5,143,324
[45] Date of Patent: Sep. 1, 1992

[54] AIRCRAFT CABIN STAIRS

[75] Inventors: Gerd Cornelius, Hasloh; Stefan Kroll, Hamburg, both of Fed. Rep. of Germany

[73] Assignee: Deutsche Airbus GmbH, Hamburg, Fed. Rep. of Germany

[21] Appl. No.: 736,709

[22] Filed: Jul. 26, 1991

[30] Foreign Application Priority Data

Aug. 18, 1990 [DE] Fed. Rep. of Germany ....... 4026192

[51] Int. Cl.⁵ .......................... B64C 1/24; E06C 9/08
[52] U.S. Cl. .................................... 244/129.6; 182/88
[58] Field of Search ................ 182/88 X; 244/129.6; 105/447, 449; 296/62

[56] References Cited

U.S. PATENT DOCUMENTS

| | | | |
|---|---|---|---|
| 1,439,030 | 12/1922 | Stahl | 244/129.6 |
| 2,669,574 | 6/1987 | Moutot | 244/129.6 |
| 2,990,148 | 6/1961 | James | 182/88 |
| 3,083,784 | 4/1963 | Urian | 182/88 |
| 3,817,554 | 6/1974 | Cuffe et al. | 182/88 |

FOREIGN PATENT DOCUMENTS

| | | | |
|---|---|---|---|
| 2313319 | 9/1974 | Fed. Rep. of Germany | 244/129.6 |
| 833730 | 4/1960 | United Kingdom | 244/129.6 |

Primary Examiner—Joseph F. Peters, Jr.
Assistant Examiner—Virna Lissi Mojica
Attorney, Agent, or Firm—Anderson Kill Oshinsky

[57] ABSTRACT

Aircraft cabin stairs to connect the aircraft fuselage to a parking area surface gave a frame comprising at least two telescoping segments as well as steps located in the region of the frame. An end segment forms part of the frame by means of side stringers which are present at least in certain regions and which are connected in a telescoping manner to side stringers of a main segment. At least one step in the region of the main segment is mounted such that it is free to slide in the direction of the stairs' longitudinal axis.

13 Claims, 10 Drawing Sheets

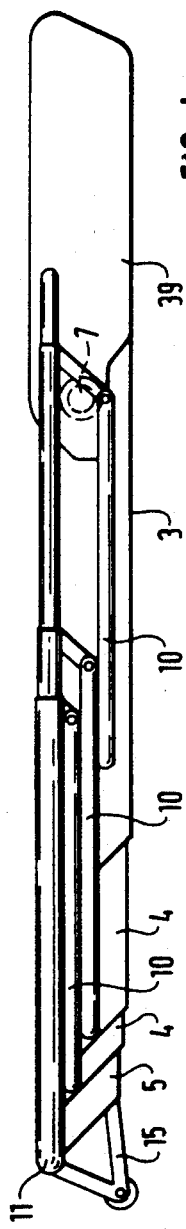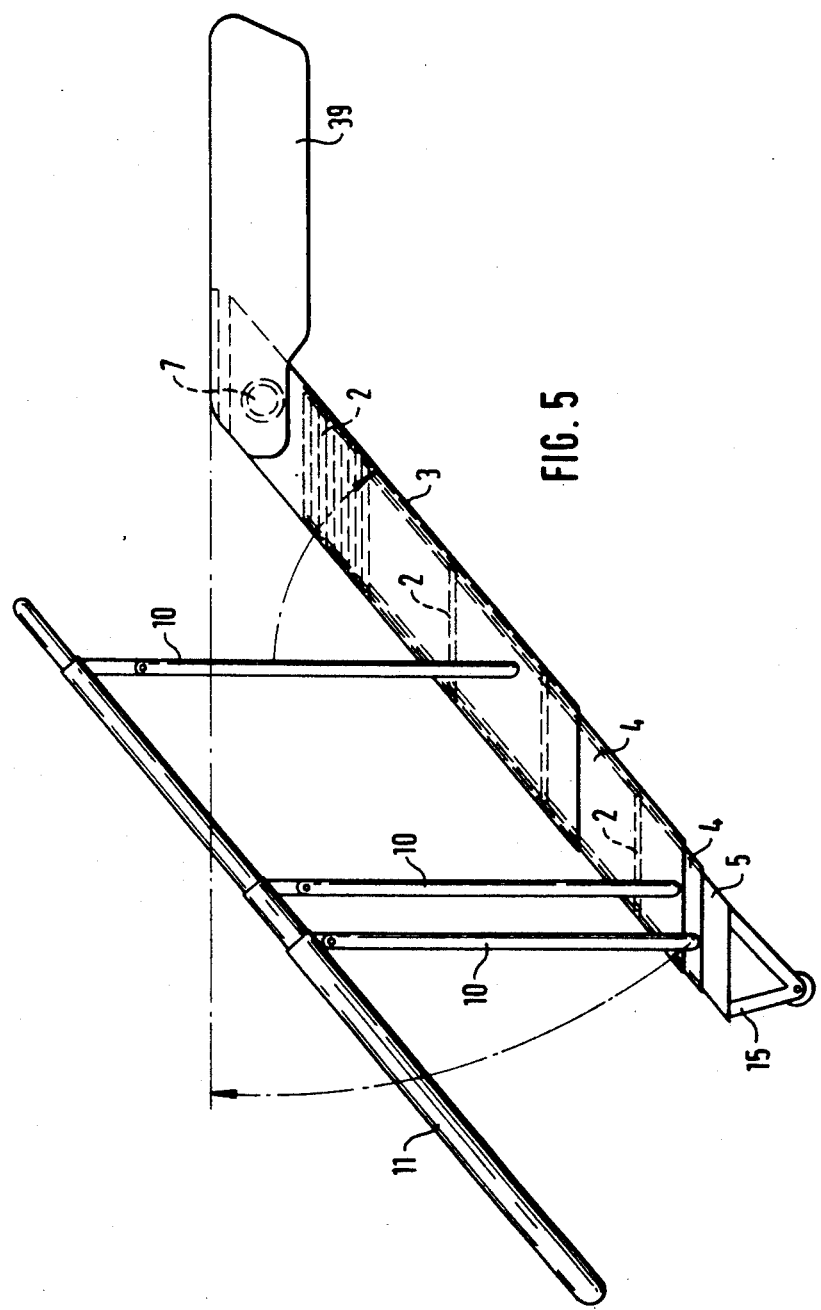

FIG. 6
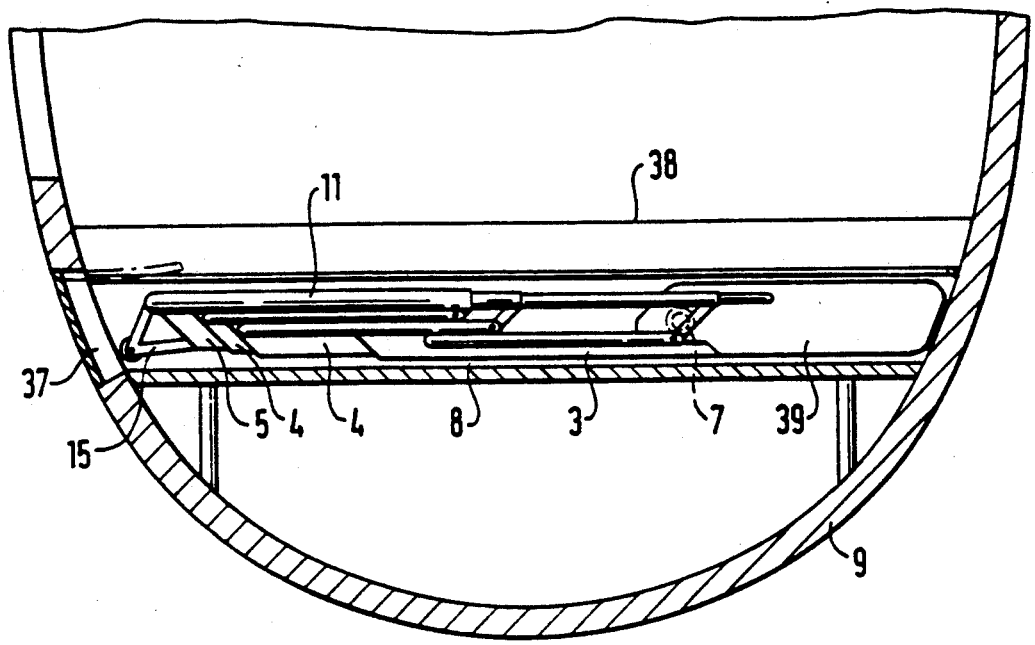
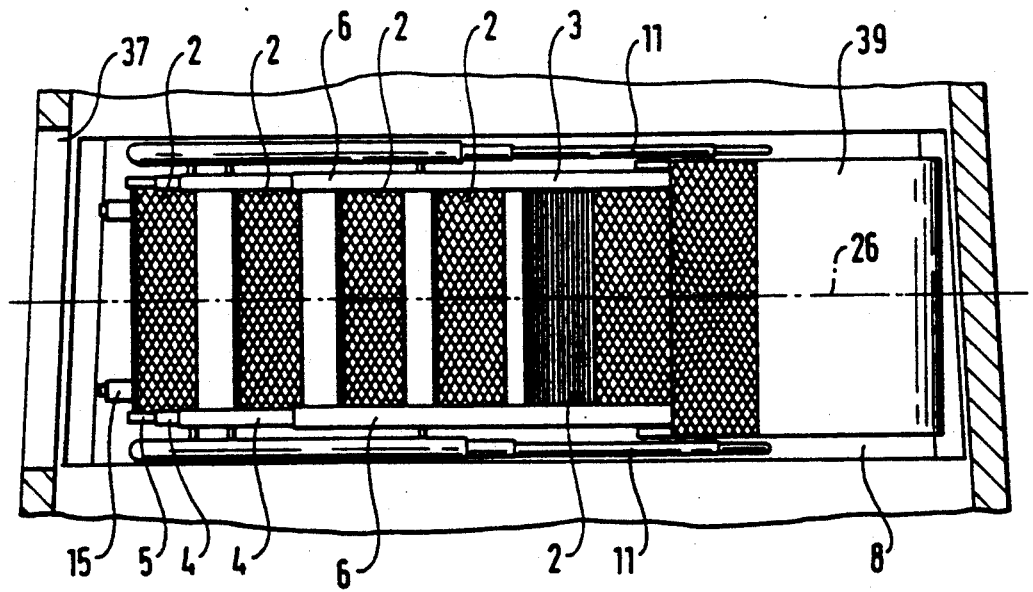
FIG. 7

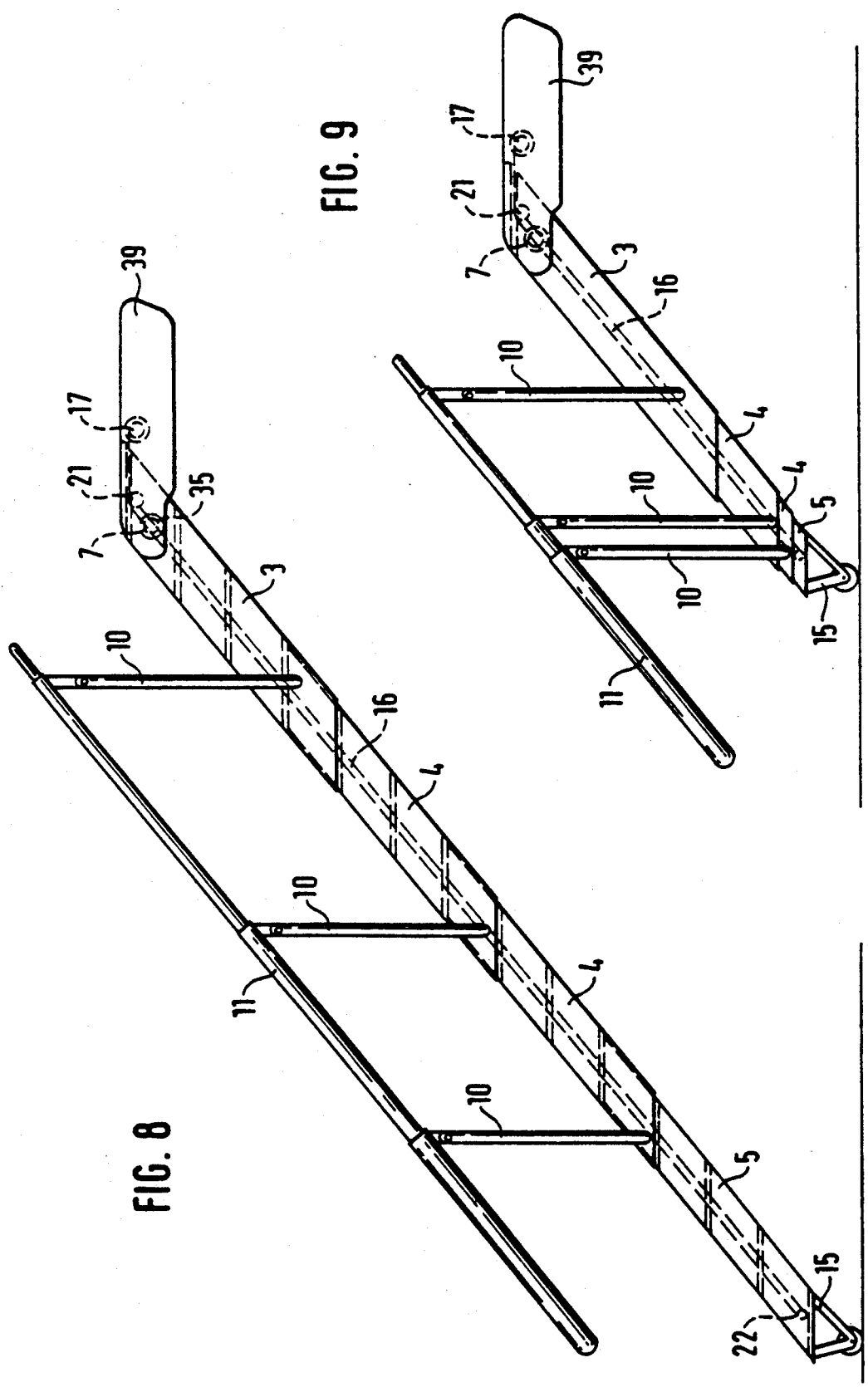

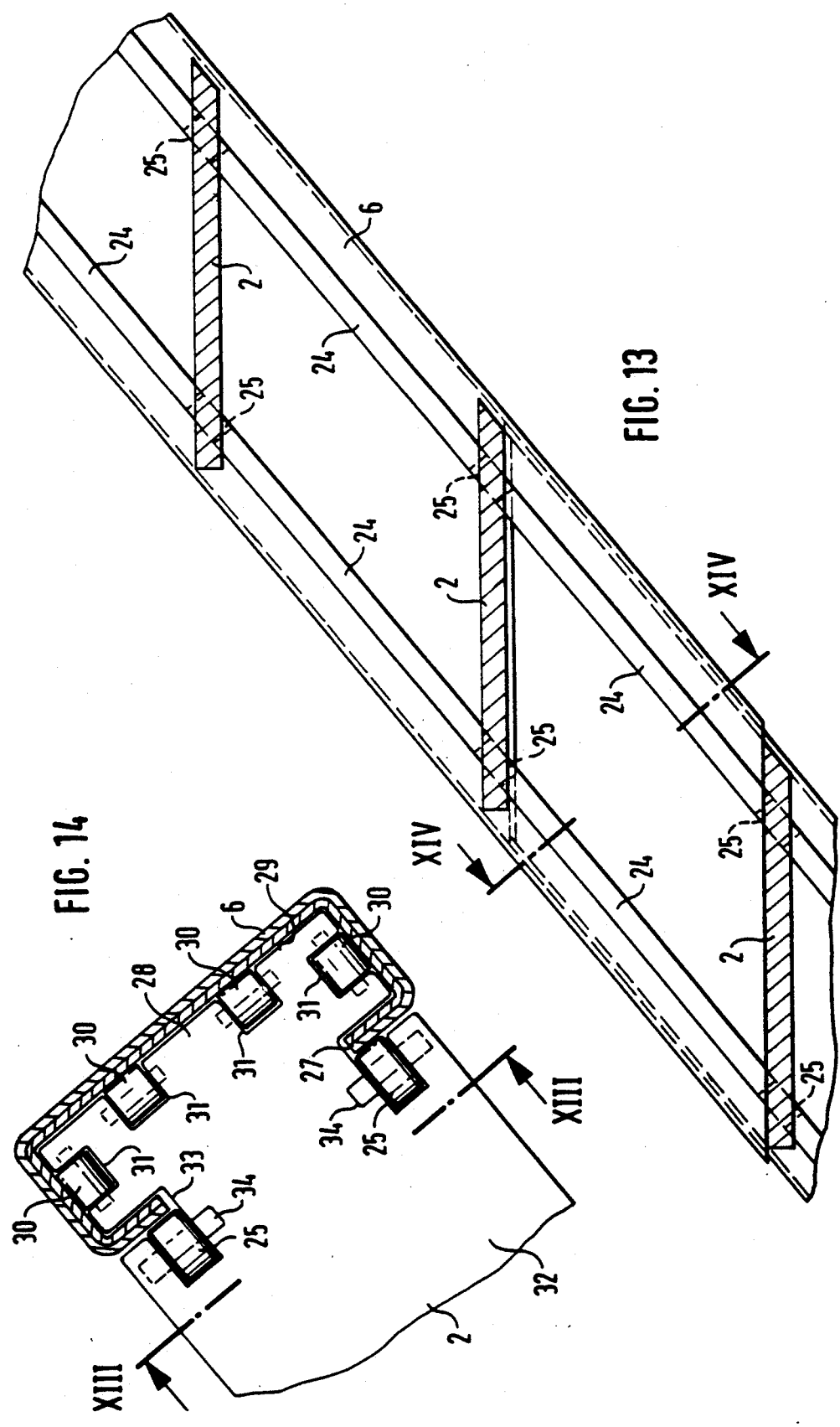

AIRCRAFT CABIN STAIRS

The invention relates to aircraft cabin stairs capable of being integrated in an aircraft fuselage during the aircraft operating mode and extendable when needed to connect the aircraft fuselage to a parking area, and in particular to cabin stairs in the form of airworthy stairs having a frame comprising at least two segments as well as steps located in the region of the frame.

BACKGROUND OF THE INVENTION

Such aircraft cabin stairs used as accesses to aircraft interiors have been disclosed in various embodiments. In addition to one-part swivelling cabin stairs which are designed to form part of an outer wall of the aircraft, and one-part slide-in stairs which can be stored in recesses in the region of the aircraft fuselage, two-part folding slide-in stairs are known in which two stair segments are connected to one another in a pivoting manner and which can be slid into a storage compartment in the region of the aircraft fuselage when the segments are pivoted against one another. However, for the prior-art slide-in stairways, a large storage compartment conforming to the volume of the stairs is necessary. Thus, the use of such slide-in stairways is particularly a problem on aircraft having fuselage-mounted aft engines. The use of prior-art aircraft stairways is also a problem with aircraft which are of a relatively small size and also have high passenger doors relative to the parking area.

SUMMARY OF THE INVENTION

A main object of the invention is improved aircraft cabin stairs of the type referred to above and capable of being stored in a space-saving manner in the aircraft fuselage.

According to one aspect of the invention, the stairs comprise at least an end segment and a main segment, each with side stringers which, at least in some regions, form the stair frame. The side stringers of the end segment are connected in a telescoping manner to the side stringers of the main segment. At least one stair step is mounted in the region of the main segment such that the step is free to slide or move in the direction of a longitudinal axis of the stairs.

The telescoping design of the frame permits the stair components to be stored in a small design volume. The telescoping together of the side stringers is made possible by the ability of some of the stair steps to slide in the direction of the longitudinal axis of the stairway. This ability to slide in the longitudinal direction means that the distance between at least some of the stair steps is reduced when the side stringers slide together, thus permitting a compact arrangement of the components in the stored aircraft stairs.

In a preferred embodiment according to the invention, there is provided at least one intermediate segment which guides the end segment in a telescoping manner and which is guided in a telescoping manner in the region of the main segment and which is located between the end segment and the main segment. The use of an intermediate segment permits a further reduction of the size of the individual segments and thus a reduced longitudinal dimension of the aircraft stairs when they are telescoped together into their telescoped condition.

In order to ensure the presence of a defined reference point for positioning the stairway relative to the frame, according to another aspect of the invention, at least one step is rigidly connected to the frame in the region of the end segment. Defined adjustment and positioning of the additional steps is achieved by having at least one sliding step connected by at least one belt both to an additional sliding step as well as to the step which is rigidly connected to the frame. When the stairway is in its extended condition, i.e., when its segments are extended, this ensures that the step which is rigidly connected to the frame extends the sliding step in accordance with the longitudinal dimensions of the belts and therefore defined or predetermined distances or spacings are present between the steps. Given the flexibility of the belts, it is also possible to provide that, when the step segments are slid together, the steps which are rigidly connected to the frame will displace the sliding steps in the direction of the stairway longitudinal axis, arranging them into a smaller storage volume.

In order to avoid damaging the belt and to avoid undesirable looping and coiling of the belt, the belt is preferably tensioned by a spring-loaded roller in the region of one of its ends. When the spring tension force is reduced as the segments are slid together, this roller winds up the belt and, when the segments are pulled apart, it also pays out the belt.

In order to guide the steps reliably, in the region of four corners of one of the steps a belt connecting the corners to another step can be provided.

The sliding together of the stair segments is facilitated by providing at least one load-bearing cable which connects the end segment to a winding unit located in the region of the fuselage storage compartment.

Sufficient freedom to position the aircraft cabin stairs is ensured by having the main segment mounted in a pivoting manner in the region of the storage compartment by means of at least one pivot bearing. This bearing method permits the frame of the aircraft stairway to be positioned at a desired incline relative to the horizontal, even with a preferred horizontal orientation of the storage compartment.

Safe use of the compact-design aircraft cabin stairs is accomplished by having a stairway railing comprised of a telescoping handrail as well as pivoting banisters which are connected both to the handrail and the frame.

To achieve defined swivelling of the main segment relative to the aircraft fuselage, in the region of the pivot bearing a known mechanism can be provided for defining the degree of swivelling and is located to set a desired swivelling angle between the main segment and the storage compartment. Appropriate positioning of the railing relative to the frame is achieved by providing means for applying a force to at least one of the banisters by a railing positioning system, which pivots the banister relative to the frame.

Advantageous stowage of the telescoped-together aircraft cabin stairs is accomplished by designing the telescoped-together end, intermediate, and main segments to fit the storage compartment.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

In the drawings:

FIG. 4 is side view of the aircraft cabin stairs according to the invention in its telescoped condition;

FIG. 5 is a side view of the aircraft cabin stairs of FIG. 1 which are telescoped together and pivoted relative to the aircraft fuselage with the stair railing in its upright position;

FIG. 6 is an enlarged partial view of the aircraft cabin stairs which are telescoped together and located in the aircraft storage compartment;

FIG. 7 is a top view of the telescoped-together aircraft cabin stairs of FIG. 1;

FIG. 8 is a side view of the extended aircraft cabin stairs with the railing in its upright position and the handrail end segment extended;

FIG. 9 is a side view similar to FIG. 8 of the partially telescoped-together aircraft cabin stairs with the railing in the upright position;

FIG. 13 is a schematic cross section of the extended aircraft cabin stairs along the line XIII—XIII of FIG. 14;

FIG. 14 is a partial cross-sectional view along the line XIV—XIV of FIG. 13.

DETAILED DESCRIPTION OF THE PREFERRED EMBODIMENTS

Figure 1:
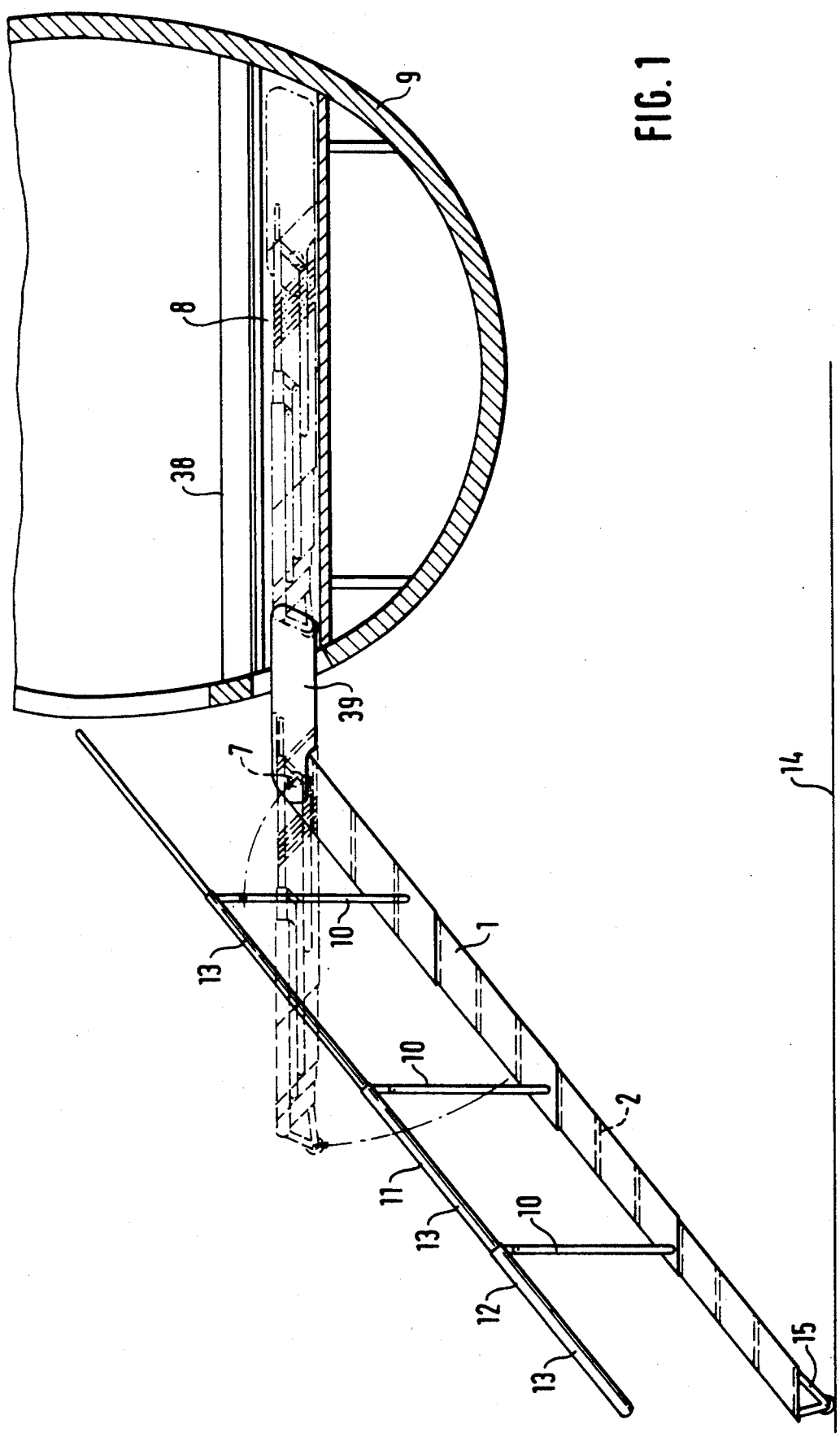
FIG. 1 is a sectional view through an aircraft fuselage showing one embodiment of the aircraft cabin stairs according to the invention in three operating states: in the first operating state the stairs are located telescoped together within a storage compartment; in the second operating state the stairs are telescoped together, but pulled out of the storage compartment; and in a third operating state, the stairs are pivoted relative to the aircraft fuselage and are extended to the ground.

A preferred embodiment of the aircraft cabin stairs according to the invention essentially comprises a frame 1 and steps 2. The frame 1 is comprised of a main segment 3, intermediate segments 4, and an end segment 5. The segments 3, 4, 5 are guided in a telescoping manner in the region of side stringers 6 (FIG. 7) which form the frame 1.

The main segment 3 is, by way of a pivot bearing 7, rotationally mounted in the region of a storage compartment 8, which is located inside of an aircraft fuselage 9. Pivoting banisters 10 are mounted in the side stringers 6. Together with a handrail 11, said banisters form a railing 12. In the region of the ends of said banisters which are remote from the side stringers 6, the banisters 10 are connected in a pivoting manner to the handrail 11. The handrail 11 is comprised of handrail segments 13 which slide together and guide each other in a telescoping manner. In the extension of the end segment 5 remote from the main segment 3, the end segment 5 has a foot element 15 which supports it on the surface of parking area 14.

Figure 11:
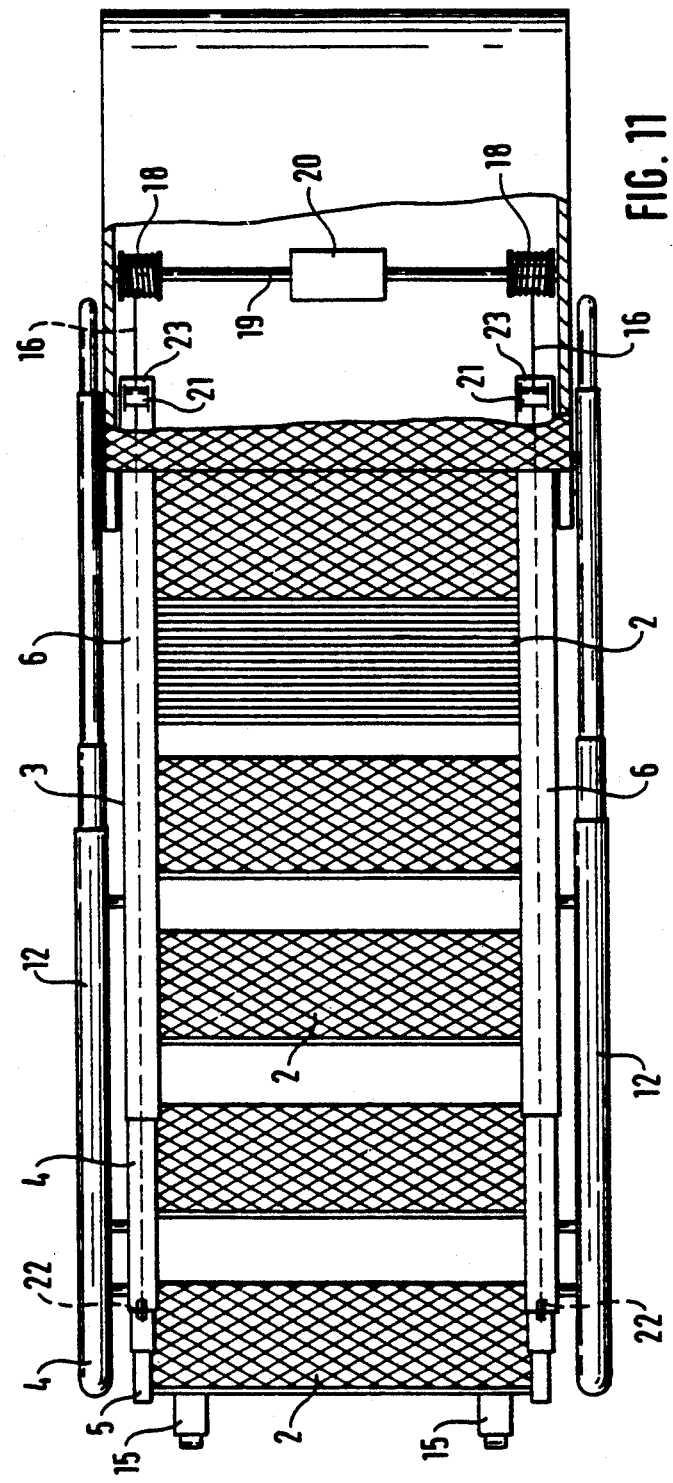
FIG. 11 is a partial cross-sectional top view of the telescoped-together aircraft cabin stairs of FIG. 10 with a cable system for positioning.

Load-bearing cables 16 (FIG. 11) are guided within the side stringers 6. Said cables are connected at one end to the end segment 5 and at the other end are held in the vicinity of a winding unit 17 (FIG. 8). In a preferred embodiment, the winding unit 17 comprises two cable rollers 18 (FIG. 11) joined by a shaft 19 driven by a winding drive unit 20. In order to guide the load-bearing cables 16 in the region of the storage compartment 8, guide rollers 21 are provided. It is also possible to locate a guide roller 22 in the region of the end segment 5 for each load-bearing cable 16 and to guide the load-bearing cables 16 in a looping configuration through the side stringers 6. One of the ends of each load-bearing cable 16 is connected to the cable roller 18 and the other end is connected to a solid mount 23 provided in the region of the storage compartment 8. An electric motor is particularly well suited for use as the winding drive unit 20.

Figure 12:
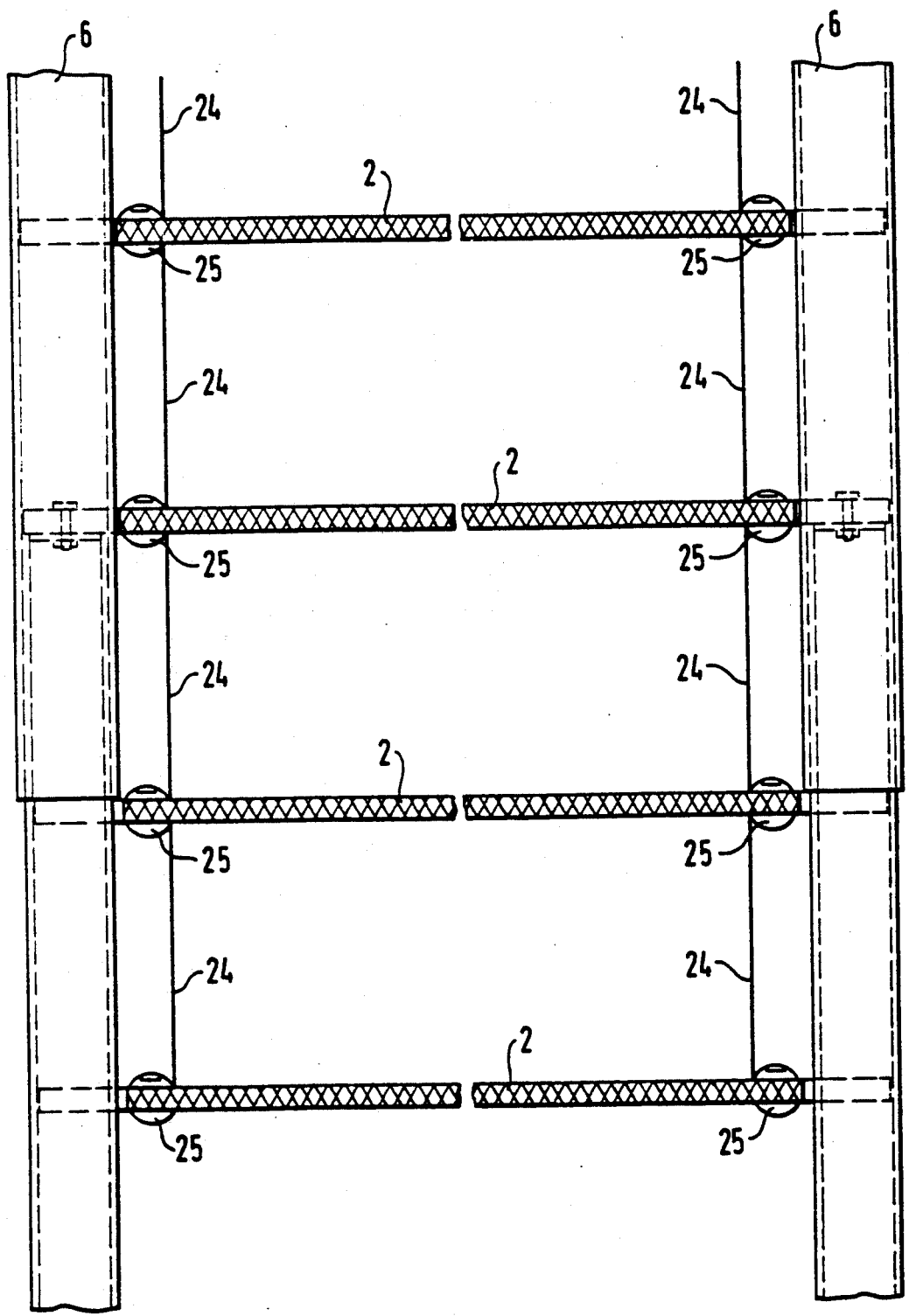
FIG. 12 is a partially enlarged view of the extended aircraft cabin staris.

The steps 2 located in the end segment 5 are rigidly connected to the side stringers 6. The steps 2 in the main segment 3 as well as in the intermediate segments 4 are mounted such that they are able to slide or move in the frame 1 and are connected to one another in turn by belts 24 (FIG. 12). A belt 24 is attached respectively in the region of one corner of each step 2. In the region of an adjoining step 2 a tensioning force is applied to the belt by a spring-loaded roller 25. The roller permits the belt 24 to be wound up automatically when tension on the belt 24 is released.

The side stringers 6 essentially have a box-shaped profile in the direction of the cabin stairs longitudinal axis 26 (FIG. 7). Said profile is provided with a guide slot 27 (FIG. 14) in the region of its lateral boundary facing the steps 2. The steps 2 with the ends of the steps 28 engage an inside space 29 of the side stringers 6 through the guide slot 27. Guide rollers 30 which guide the step 2 are located in the region of the inside space 29. Said guide rollers engage correspondingly designed recesses 31 on the step ends 28. The step ends 28 are connected to step main bodies 32 by means of a step neck 33, which is formed around the guide slot 27. The rollers 25 are guided such that they are free to rotate in the region of one belt roller mount 34 each.

Figure 3:
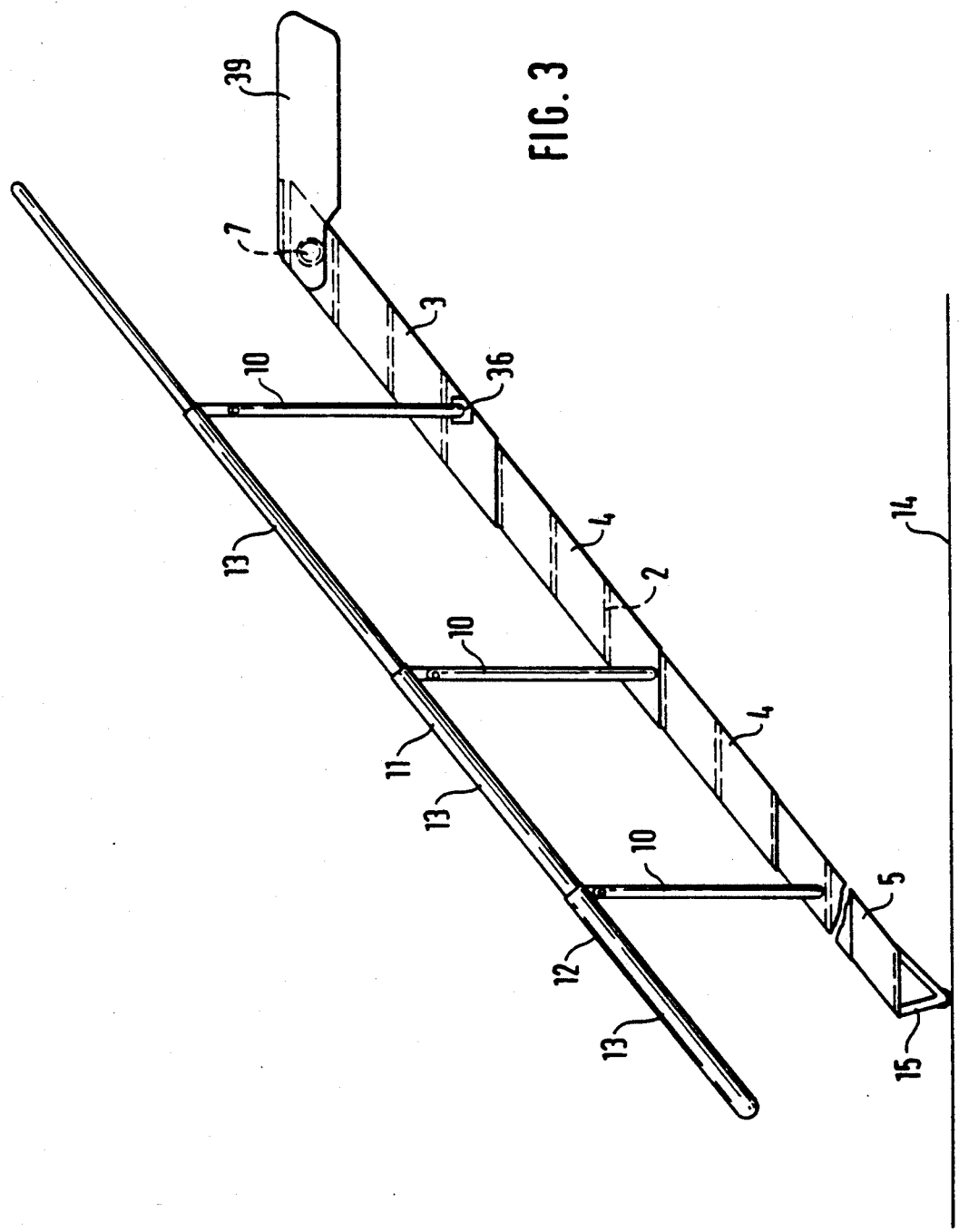
FIG. 3 is an enlarged side view of the aircraft cabin stairs of FIG. 2 in its extended condition.
Figure 10:
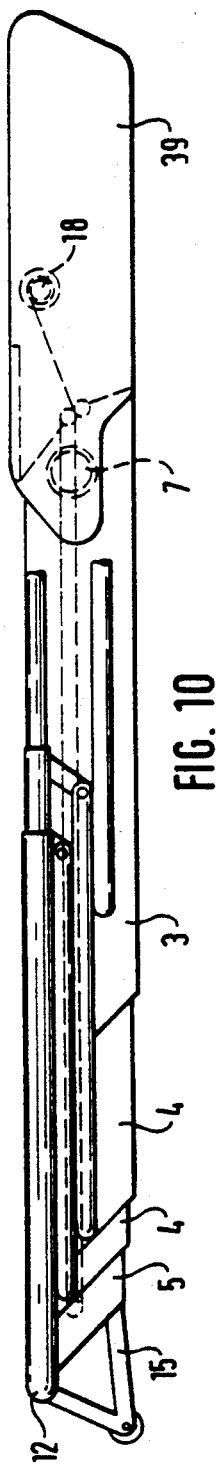
FIG. 10 is a side view of the telescoped-together aircraft cabin stairs with the railing not swung upright.

A known mechanism defining the degree of swivelling 35 (FIG. 8) is located in the region of the pivot bearing 7 in order to adjust in a defined manner the swivelling angle of the main segment 3 relative to the aircraft fuselage 9. This known mechanism defining the degree of swivelling 35 can be designed as a gear drive or as a chain drive. In addition, to position the cabin stairs railing 12 relative to the frame 1, a railing positioning system 36 (FIG. 3) is also provided. Said system can also be comprised of a known gear drive or a chain drive. The cabin stairs railing is brought to the upright position with the aid of the railing positioning system or it is pivoted such that is contacts the region of the frame 1.

Figure 2:
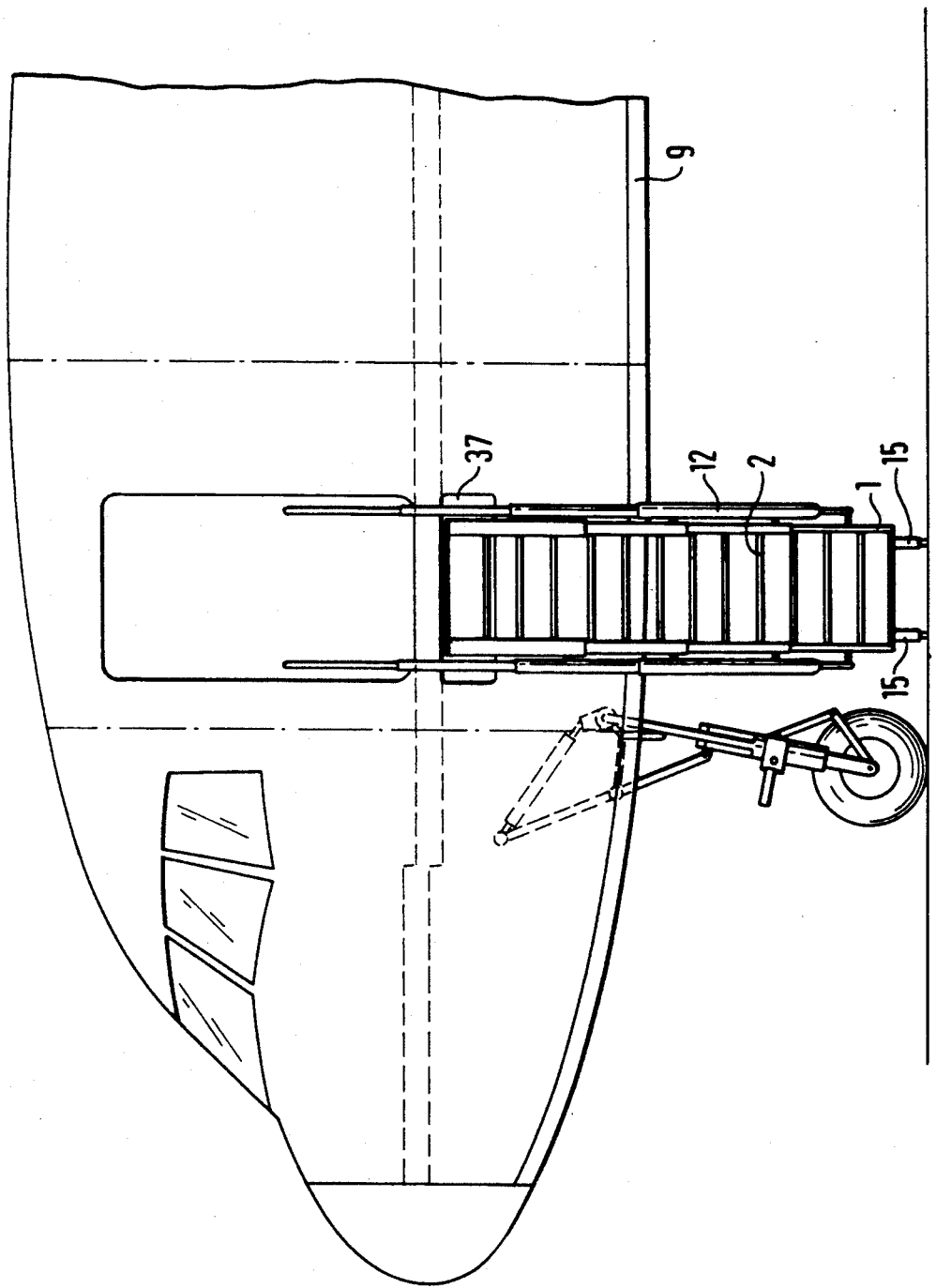
FIG. 2 is a partial side view of the aircraft of FIG. 1 with the aircraft cabin stairs in its third extended position.

In order to permit the aircraft cabin stairs to be used when the aircraft is on the ground, the telescoped-together cabin stairs are first extended out of an opening 37 (FIG. 2) of a storage compartment 8 beneath the cabin floor 38. After the cabin stairs have been sufficiently extended, the mechanism defining the degree of swivelling 35 is used to pivot the cabin stairs about the pivot bearing 7, and the railing positioning system 36 is used to place the railing in the upright position 12.

Mounting in the region of the aircraft fuselage 9 is accomplished with the aid of a mounting segment 39 (FIG. 1). Since the load-bearing cables 16 are unwound from the winding unit 17 during this process, the end segment 5 as well as the intermediate segments 4 are pulled out of the main segment 3 as well as out of each other as a consequence of the force of gravity. However, a hydraulic drive can also be provided to assist in extending the aircraft cabin stairs. In addition, other drives may be provided. While the cabin stairs are being extended, the steps 2 which are able to slide in the main segment 3 as well as those which are mounted in the intermediate segments 4 are pulled apart and out from the steps 2 which are rigidly connected to the end segment 5. This pulling out of the steps is accomplished by means of the connection established by the belts 24.

Similarly, the handrail segments 13 of the railing 12 are pulled out in the direction of the longitudinal cabin stairs axis 26. After completion of the extension operation, the cabin stairs are supported by the foot element 15 on the surface of the parking area 14 and the steps 12 are positioned relative to one another in a defined manner.

When the load-bearing cables 16 are wound up onto the winding units 17, the steps are retracted by a pulling together of the segments 3, 4 5. Then, the sliding steps 2 are pushed by the steps which are rigidly connected to the end segment 5, and the respective belts 24 are automatically wound up onto the rollers 25 as a consequence of its spring tension. After the segments 3, 4, 5 have run together completely and the railing 12 has swung down, and once the aircraft cabin stairs have been properly pivoted upward relative to the storage compartment, the stairs can be restowed in the storage compartment 8.

Figure 15:
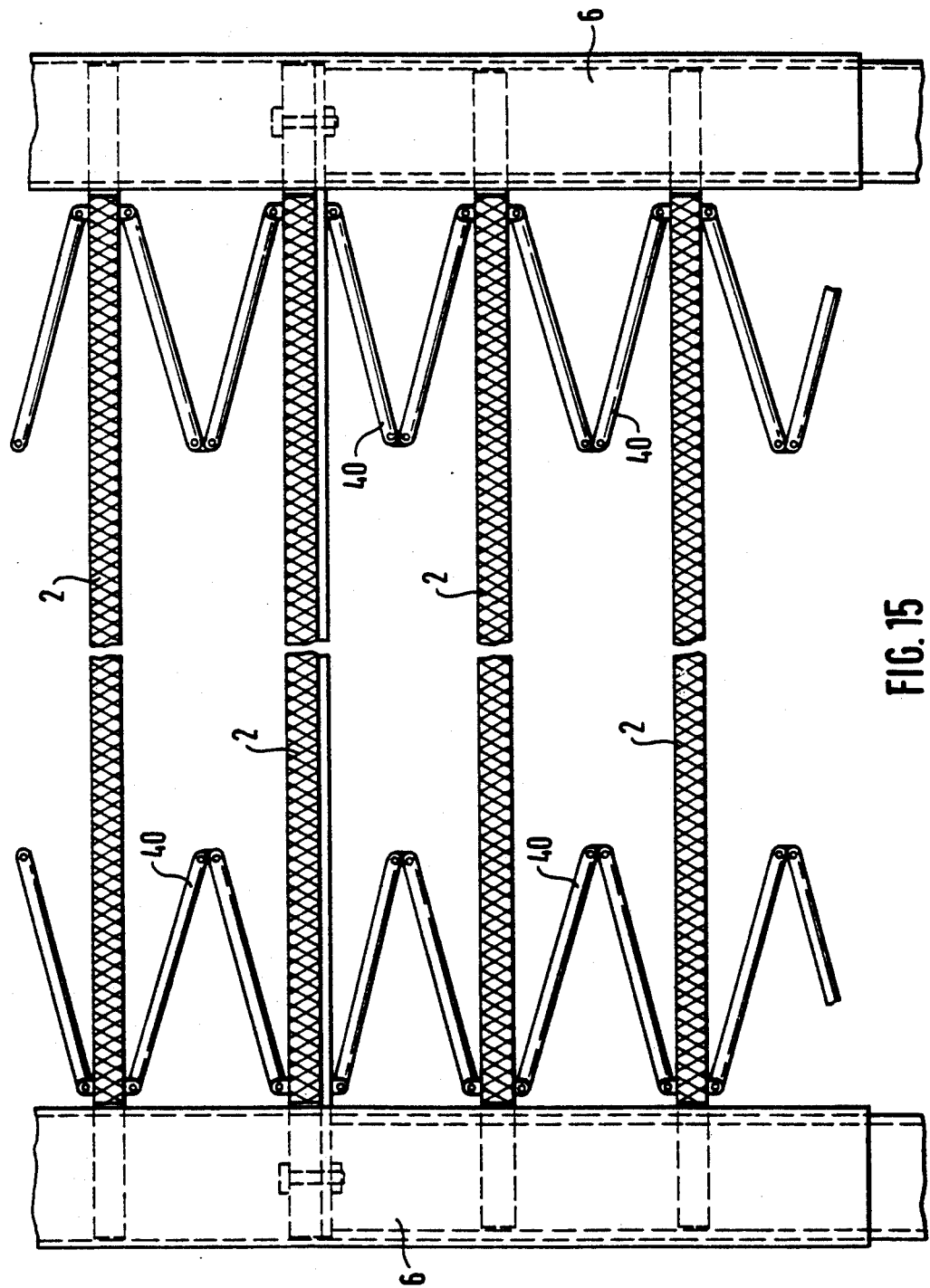
FIG. 15 is a further embodiment of extended aircraft cabin stairs having a bent-arm linkagek between the steps.

In an alternative embodiment, shown in FIG. 15, bent-arm linkages (40) are located between the individual sliding steps (2). This ensures that the stairs cannot assume any dead-motion positions. In other respects, the arrangement is identical to the arrangement which uses belts (24).

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. Aircraft cabin stairs integrated in the aircraft fuselage for connecting the aircraft fuselage to a parking area surface, comprising a frame with steps, said frame comprising at least an end segment and a main segment each having side stringers which are connected in a telescoping manner to each other, and a number of the steps being slidably mounted in the region of the main segment such that the steps are free to slide in the direction of a longitudinal axis of the stairs so that the steps are equally oriented to each other in both a pushed together state and an extended state of the side stringers and only spacing of the steps changes, and so that planes of the steps maintain their orientation relative to the side stringers in both the pushed together and extended states.

2. The aircraft cabin stairs of claim 1, further comprising at least one intermediate stair segment which guides the end segment in a telescoping manner and is guided in a telescoping manner in the region of the main segment, said intermediate segment being located between the end segment and the main segment.

3. The aircraft cabin stairs of claim 1, wherein at least one step is rigidly connected to the frame in the region of the end segment.

4. The aircraft cabin stairs of claim 1, further comprising a second slideable step, and at least one belt connected from the first slideable step both to the second sliding step as well as to the step which is rigidly connected to the frame.

5. The aircraft cabin stairs of claim 4, further comprising a spring-loaded roller connected to and applying a force to the belt in the region of one of its ends.

6. The aircraft cabin stairs of claim 4, wherein the belt is located near a corner of one of the steps connecting said step to a different step.

7. The aircraft cabin stairs of claim 1, further comprising a winding unit located near a storage compartment in the fuselage for the stairs and at least one load-bearing cable which connects the end segment to the winding unit and provided in the region of the frame.

8. The aircraft cabin stairs of claim 1, further comprising at least one pivot bearing for swivel-mounting the main segment in the region of the storage compartment.

9. The aircraft cabin stairs of claim 1, further comprising a railing comprised of a telescoping handrail and banisters connected to the handrail and the frame.

10. The aircraft cabin stairs of claim 8, further comprising a mechanism defining the degree of swivelling between the main segment and the storage compartment, is located in the region of the pivot bearing (7).

11. The aircraft cabin stairs of claim 9, further comprising a railing positioning system for applying a force to at least one of the banisters for pivoting the banisters relative to the frame.

12. The aircraft cabin stairs of claim 2, wherein the telescoping end segment, intermediate segments, and main segment are configured to fit the storage compartment in the telescoped condition.

13. Aircraft having a fuselage with a storage compartment, telescoped cabin stairs stowed in the storage compartment, said cabin stairs having plural segments comprising an end segment and a main segment, said end segment having at least one fixed step, said main segment having at least one slideable step, said fixed and slideable steps being adjacent one another in a stowed condition of the cabin stairs, means for pivotably mounting the main segment to the fuselage, and means for extending the cabin stairs out of the storage compartment toward ground, said means for extending comprising means for causing the slideable step to move relative to the fixed step while the stairs are extending so that the steps are spaced apart a predetermined distance when the stairs are fully extended and so that the planes of the steps maintain their orientation relative to each other in both the pushed together and extended states and only the spacing of the steps being changeable.

* * * * *